Patented Jan. 17, 1928.

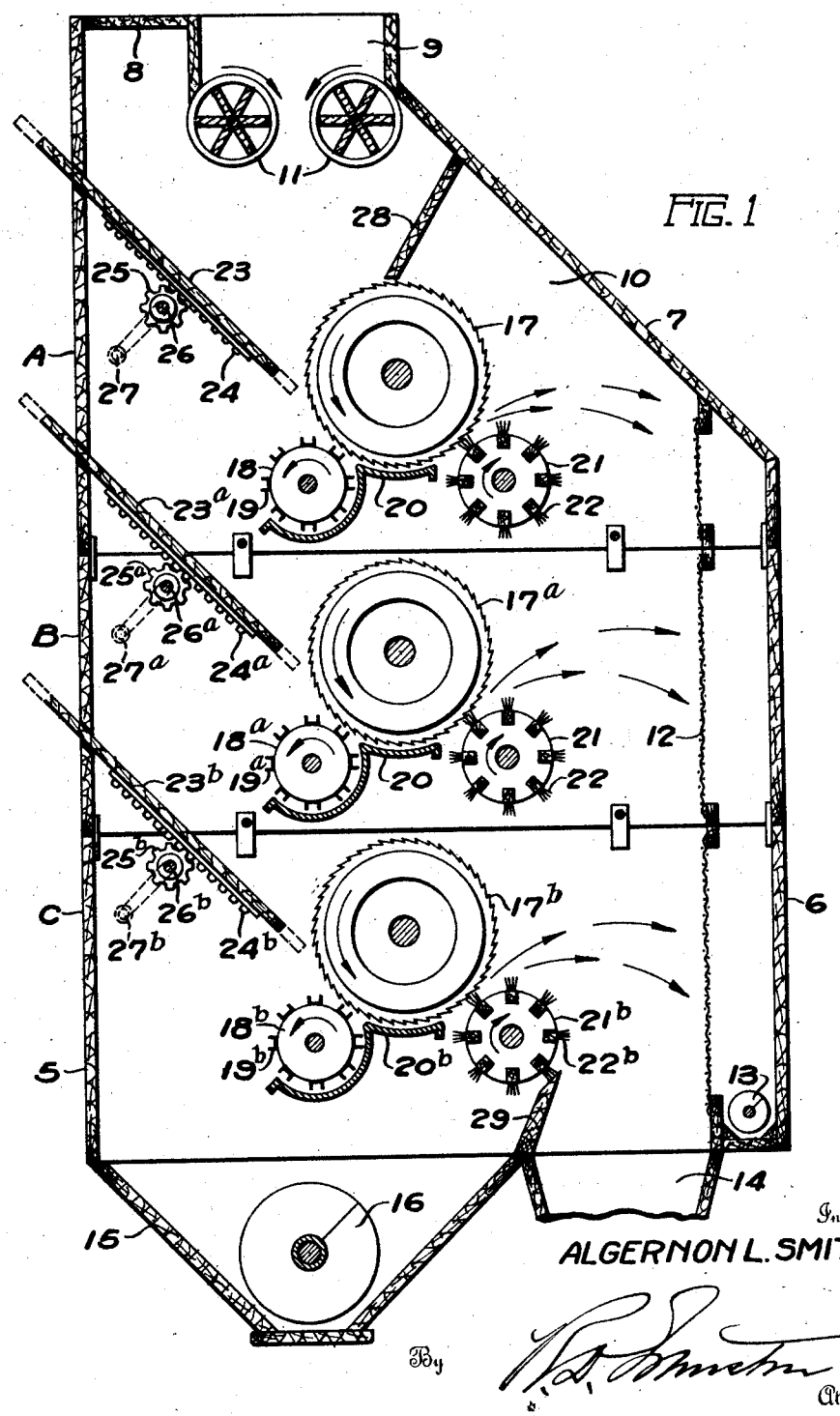

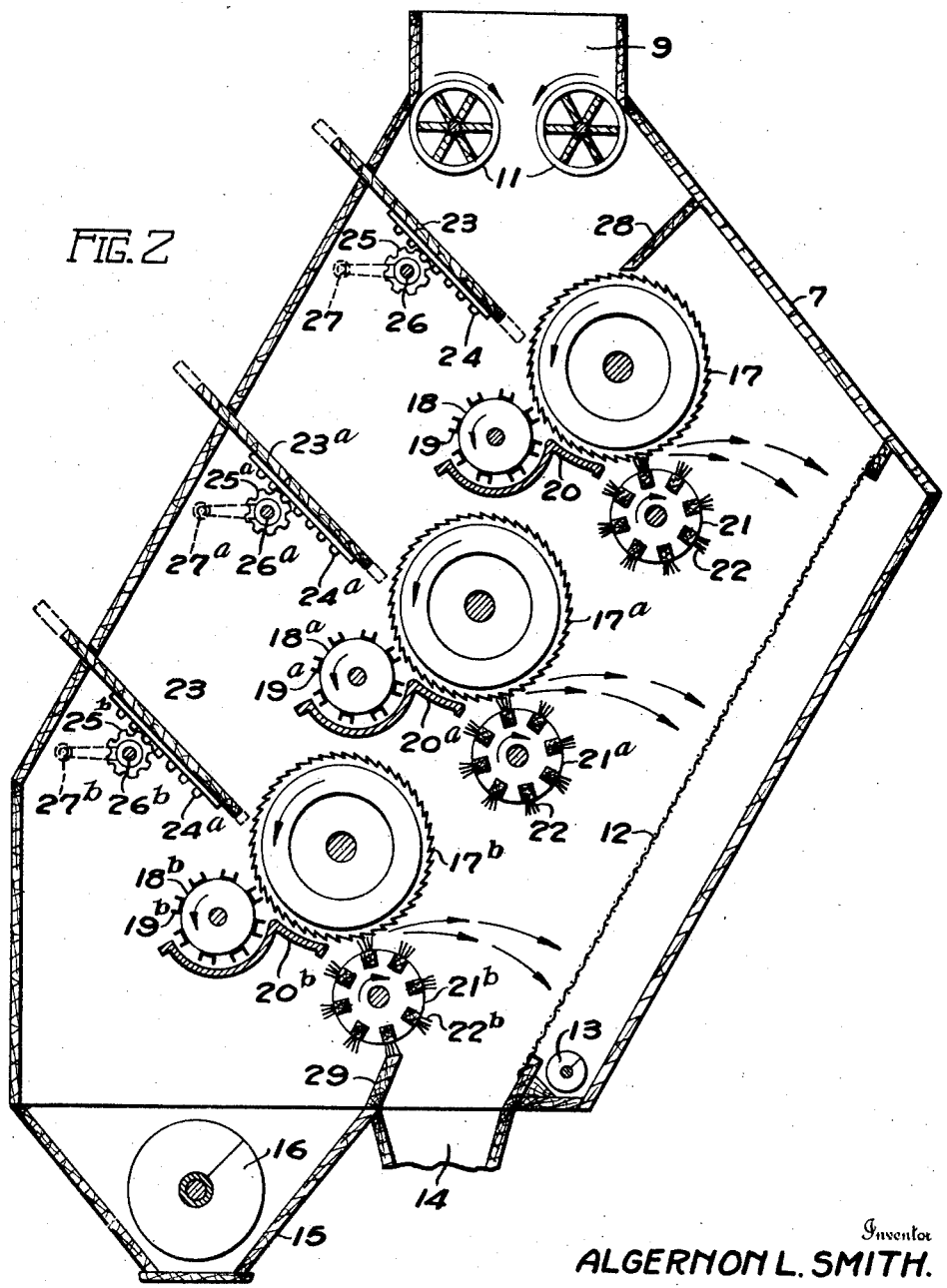

1,656,398

UNITED STATES PATENT OFFICE.

ALGERNON L. SMITH, OF BIRMINGHAM, ALABAMA.

HULL EXTRACTOR.

Application filed October 15, 1926. Serial No. 141,741.

This invention has general reference to apparatus adapted for the mechanical removal of foreign matter from fibrous materials, but relates more particularly to apparatus of the said general character which is especially suitable for use in extracting the hulls, trash and dirt that commonly are present in cotton before it is ginned.

A primary object of the present invention is to produce a hull extractor in which a plurality of rotatable saw cylinders or the like, each having associated with it a rotatable picker roller, and a doffing means, are arranged at successively lower levels in a suitable casing, provision being made for the passage of mixed cotton and hulls knocked back by a picker roller from an upper to the next lower one of such saw cylinders, and the preferable arrangements and directions of rotation of the saw cylinders and their picker rollers being such that the hulls and such cotton as may adhere thereto as extracted from the seed cotton passing to the doffing means, are confined to the path of travel which keeps them separated from the untreated cotton above each saw cylinder. Where the saw cylinders are arranged in vertical alignment or at a steep angle, my invention contemplates the provision of guide means such as hull boards being interposed in the passageway for the mixed cotton and hulls, and being so arranged as successively to present the hulls with any accompanying cotton to the saws until the hulls are cleaned to the desired extent.

A further object is so to arrange the saw cylinders, and the picker rollers, and such hull boards or guide means as are needed to co-act with the respective ones thereof, that all of the saw cylinders may be rotated in the same direction to carry the mixed cotton and hulls downwardly by gravity or away from the approaching mass of cotton to be treated, and the seed cotton doffed from the saws by the doffing brushes or equivalent means may be delivered from all of them in substantially the same direction, so as to pass preferably through a common passageway to an outlet separate and apart from the outlet for the hulls.

And a still further object is to mount each of the saw cylinders, and the picker roller, doffing brush and hull board that co-act therewith, in a separable unit of the casing, so that the number of de-hulling treatments to which the cotton is to be subjected may be increased or decreased, according to the character and grade of the cotton to be treated, by varying the number of such units comprised in the hull extractor.

The means by which the foregoing and other objects are accomplished by my invention, and the manner of their accomplishment, readily will be understood from the following description on reference to the accompanying drawings, which depict preferred embodiment of the invention, and in which:—

Fig. 1 is a transverse sectional view of my improved hull extractor, with the casing shown somewhat diagrammatically, while the operating parts, all of which per se are of types that are well-known to those skilled in this art, and illustrated conventionally.

Fig. 2 is a view similar to Fig. 1, but showing a modified form of hull-extractor casing, and a modified arrangement of the operating parts therein.

As shown in the drawings, in which corresponding parts are identified by like reference characters in the different views, and referring first to Fig. 1, the casing of the hull extractor, which is shown illustratively as being of wooden construction throughout, comprises a rear side wall 5; a front side wall 6, having a rearwardly-inclined upper extension 7; a top 8, having a suitable inlet opening 9 therein, through which the mixed seed cotton and hulls may be delivered in any preferred manner to the hull extractor; and end walls, one of which is indicated by 10. Preferably, the casing of the hull extractor is made up of a plurality of separable units, which for convenience of description are indicated by the reference characters A, B, and C, said units being suitably secured together in such a way that they readily may be assembled or knocked down, the number of such units employed at any time readily may be varied, and access to the interior of the casing, as for purposes of repairs or replacements, may be facilitated. Suitably supported in the inlet 9 are a pair of co-acting feed-rollers 11, which preferably are fluted so as to be adapted for use in regulating the rate at which the mixed cotton and hulls are fed into the hull extractor. Spaced a suitable distance away from the front side wall 6, and preferably substantially parallel therewith, is a dust-screen 12, having at its lower end a screw-conveyor 13 for the removal from the casing of such dirt and dust as pass through the screen. An opening is provided at 14 for the discharge of the hulled cotton from the huller casing, and a receptable 15, having a screw-conveyor 16 therein, is provided for the hulls and coarse particles of other foreign matter that drop to the bottom of the huller casing.

For the purpose of illustrating the operation of my improved hull extractor, I have shown the casing in Fig. 1 as being made up of three separable units, containing exactly similar sets of operating parts, the first or initial set comprising a saw cylinder formed of a series of spaced saws or other equivalent members, such as are indicated by 17; a stripper roller 18, having suitable fingers or spikes 19 projecting from the outer cylindrical surface thereof; a deflector plate 20; a doffing brush 21, having bristles 22 projecting from its outer surface; and a hull board 23, the position of which is adjustable longitudinally by means of a rack 24 and its co-operating pinion 25, which is secured upon a shaft 26 that is rotatable through the medium of a hand-crank 27. The unit which acts on the hulls after treatment by the first or initial set comprises similar parts correspondingly numbered except that the numerals bear the suffix a and the final unit that acts on the hulls comprises similarly numbered parts except the numerals bear the suffix b. However, it is to be understood that the number of such casing units, and hence the number of such sets of operating parts, is in no wise fixed, but may vary widely under different working conditions, which will be particularly affected by the nature of the cotton to be hulled, as to whether or not it is bolly or immature, or has been carelessly gathered and contains many hulls and a great deal of trash. The invention contemplates the use of at least two of the sets of operating parts, and the number thereof to be employed always preferably will be sufficient to insure the separation of substantially all of the cotton from the hulls and other foreign matter.

Above the uppermost saw cylinder 17 is a guide-board 28, which co-operates with the uppermost hull board 23 in directing the mixed cotton and hulls downward toward the rear peripheral surface of said saw cylinder, and at the bottom of the huller casing a guide-board or partition member 29 maintains the separation of the hulls from the hulled cotton as they are about to pass into the receptacle 15 and the discharge opening 14, respectively.

In the modified form of huller casing shown in Fig. 2, and the modified arrangement of the operating parts as shown in said figure, the front side wall of the casing and the dust screen 12 are sufficiently inclined so that the cotton doffed from the saw cylinders will roll or slide down said screen, and dust and dirt will therefore be more effectively and efficiently removed from the cotton. Also, the amount of head-room required for the casing is reduced, and it is otherwise rendered more compact, by arranging the saw cylinders, and the members that co-act therewith, in conformity with the inclination of the front and rear side walls of the casing and of the dust-screen, and by suitably regulating the angle of such inclination the passage of the mixed cotton and hulls by gravity from an upper saw cylinder to position for engagement by the next lower one takes place with little or no guiding assistance from hull boards or the like.

From the foregoing description, the operation of my improved hull extractor readily will be understood. The mixed cotton and hulls are introduced in any suitable manner into the opening 9, and through rotation of the fluted rollers 11 in the respective directions indicated by the arrows on said rollers, said material is fed downward into the space defined by the deflector 28 and the hull board 23, and thus into engagement with the saw cylinder 17. The position of said hull board is regulated by means of its hand-crank 27 and the rack and pinion operated thereby, so as to regulate suitably the opening between the lower end of said hull board and the periphery of the saw cylinder. Both the saw cylinder 17 and the stripper roller 18 are rotated in the same direction, which in the views shown in the drawings is counter-clockwise, as indicated by the arrows, and the cotton that is separated from the hulls is moved by the saws toward the front of the huller frame and is thrown against the dirt screen 12 as the doffing brush 21 (rotating at comparatively high speed in the direction indicated by the arrow thereon) assists in freeing the cotton from the saws, the dust and dirt in the cotton passing through the dust screen 12 and dropping down into a trough of the screw-conveyor 13, and the hulled cotton dropping into the opening at 14. Meanwhile, the hulls, carrying with them such cotton as is not extracted by the first step in the operation of the huller, are through toward the rear side of the huller frame, and pass downward by gravity to the slide 23ª (the position of which will have been suitably regulated initially) and to the saw cylinder 17ª and its co-acting stripper roller 18ª. When they have passed the lowermost one of the sets of operating parts, the number of which sets, as stated hereinbefore, may be varied at will, the hulls drop into the receptacle 15, from which they are removed by the screw-conveyor 16. The purpose of the deflecting plates 20, 20ª, 20ᵇ is to insure that none of the cotton will drop from the saw cylinders into the space between the stripper rollers 18, 18ª, 18ᵇ and their respective doffing brushes 21, 21ª, 21ᵇ and likewise to guard against the dropping of any of the hulls into said space. The portion of said plate which co-acts with the saw cylinder may be dispensed with if desired, in cases where the cotton shows no tendency to drop from the saws.

In referring in this specification, and in the appended claims, to a "stripper roller", a "doffing brush", and a "hull board", it is to be understood that said terms are intended to be interpreted in their broadest sense, as covering, respectively, any means adapted to perform the functions of stripping or otherwise separating hulls and other like foreign matter from cotton or other fibrous material; of doffing or otherwise disengaging such fibrous material from saw cylinders or other similar devices; and of directing fibrous material toward and into engagement with such saws or the like, for the purpose of subjecting such material to a separating or cleaning operation.

Various modifications of minor details of the improvements disclosed herein doubtless readily will suggest themselves to those skilled in this art, but such modifications fall within the scope of my inventive rights, and my invention therefore is not to be construed as being limited to any details not specifically set out in the claims.

Having thus described my invention, what I claim as new and desire to secure by Letters Patent, is:—

1. In a cotton huller having an inlet opening, a saw cylinder arranged to draw the mixed seed cotton and hulls inwardly from said opening, a second saw cylinder having the same direction of rotation as the first mentioned saw cylinder, a stripper roller acting on the seed cotton engaged by the first mentioned cylinder to deflect hulls therefrom and from contact with the incoming seed cotton to the second saw cylinder, a stripper roller associated with the second saw cylinder, and means to doff the dehulled seed cotton from both saw cylinders and keep it separate from the hulls.

2. In a cotton huller having an inlet opening, a saw cylinder arranged to draw the mixed seed cotton and hulls inwardly from said opening, a stripper roller acting on the inwardly-moving side of the saw and disposed to deflect the hulls away from the inwardly-traveling seed cotton; means to doff the seed cotton from said saw cylinder and to divert it away from the hulls; a second saw cylinder disposed to receive the hulls and cotton stripped from the first mentioned saw cylinder and having the same direction of rotation as said latter cylinder; means to cause the hulls deflected from the first mentioned saw cylinder by its stripper roller to engage the second saw cylinder; and means to direct the seed cotton and hulls in different courses from said second saw cylinder.

3. In a machine for hulling seed cotton, a plurality of saw cylinders rotatable in the same direction and disposed to successively act upon the cotton and hulls to be treated; and a rotatable stripper roller associated with each saw cylinder and arranged respectively to knock off the hulls in the direction of the travel of the hulls through the machine and in a direction away from the seed cotton and hulls approaching their respective saw cylinders, the stripper rollers being disposed on the down-going side of their respective saw cylinders remote from the approach of the seed cotton and hulls to be treated and being rotated in a direction to knock off the hulls toward the next succeeding saw cylinder and away from the approaching cotton and hulls to be treated.

4. A machine for hulling seed cotton, comprising a casing having rotatably mounted therein a series of saw cylinders arranged at successively lower levels and having a common direction of rotation; a stripper roller for each saw cylinder disposed on its down-going side and arranged in a position to divert the hulls tripped by it from its respective cylinder away from the cotton and hulls approaching its said respective saw cylinder for treatment, the cylinders and picker rollers being arranged for successively presenting the hulls to successive saw cylinders until they are cleaned; and means to doff the saw cylinders.

5. A machine for hulling seed cotton, comprising a casing having rotatably mounted therein a series of saw cylinders arranged at successively lower levels; a stripper roller for each saw cylinder, disposed on its down-going side and arranged in a position to knock the hulls away from the cotton approaching its respective saw cylinder for treatment, thereby successively presenting the hulls to successive saw cylinders until they are cleaned; means to doff the saw cylinders, said doffing means being arranged to keep the seed cotton separated from the hulls; and separate outlets for the seed cotton and hulls.

6. A machine for hulling seed cotton, comprising a casing having rotatably mounted therein a series of saw cylinders arranged at successively lower levels and having a common direction of rotation; doffing means for the saw cylinders; a stripper roller for each saw cylinder, disposed on its down-going side and each arranged in a position to divert the hulls stripped from its respective cylinder away from the cotton approaching its respective saw cylinder for treatment, thereby successively presenting only the hulls and cotton adhering thereto to successive saw cylinders, said doffing means being arranged to keep the seed cotton separated from the hulls; and separate outlets for the seed cotton and hulls, the saw cylinders being arranged for a gravity flow through the casing, the hulls under treatment falling on one side of a plane through the axes of the several saw cylinders, and the cleaned seed cotton falling on the other side of said plane.

7. In a machine for hulling seed cotton, a series of saw cylinders having a common direction of rotation and arranged at successively lower levels; an element acting as a hull-board to direct hulls and cotton to each saw cylinder; means disposed below each hull-board and which co-act with its respective saw cylinder to divert in the same direction hulls carried by the saw past the adjacent preceding hull-board; and means to doff the cleaned seed cotton from the saw cylinders.

8. In a machine for hulling seed cotton, an overhead feed hopper having a saw cylinder adapted to remove therefrom hulls and seed cotton; a stripper roller on the down-going side of the saw to divert hulls therefrom laterally in one direction away from the approaching seed cotton and hulls; doffing means to doff the seed cotton from the saw cylinder laterally in a different direction from that taken by the flight of the hulls; a lower saw cylinder having the same direction of rotation as the first-mentioned saw cylinder; a hull-board adapted to direct the hulls knocked from the upper saw cylinder toward the lower saw cylinder; and a stripper roller and doffing means co-acting with said lower saw cylinder.

In testimony whereof I affix my signature.

ALGERNON L. SMITH.